(12) United States Patent
Mealey et al.

(10) Patent No.: US 8,843,673 B2
(45) Date of Patent: Sep. 23, 2014

(54) OFFLOADING INPUT/OUTPUT (I/O) COMPLETION OPERATIONS

(71) Applicant: International Business Machines Corporation, Armonk, NY (US)

(72) Inventors: Bruce G. Mealey, Austin, TX (US); Greg R. Mewhinney, Austin, TX (US); Mysore S. Srinivas, Austin, TX (US); Suresh E. Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/771,608

(22) Filed: Feb. 20, 2013

(65) Prior Publication Data

US 2014/0143465 A1 May 22, 2014

Related U.S. Application Data

(63) Continuation of application No. 13/680,752, filed on Nov. 19, 2012.

(51) Int. Cl.
*G06F 3/00* (2006.01)
*G06F 9/52* (2006.01)
*G06F 13/26* (2006.01)
*G06F 11/20* (2006.01)

(52) U.S. Cl.
CPC .............. *G06F 13/26* (2013.01); *G06F 11/203* (2013.01); *G06F 9/52* (2013.01)
USPC ................................. 710/36; 712/28; 712/34

(58) Field of Classification Search
CPC ........................... G06F 11/203; G06F 11/2028
USPC ............................................................. 710/36
See application file for complete search history.

(56) References Cited

U.S. PATENT DOCUMENTS

| | | | |
|---|---|---|---|
| 6,085,277 A | 7/2000 | Nordstrom et al. | |
| 6,292,822 B1* | 9/2001 | Hardwick | 718/105 |
| 6,754,738 B2 | 6/2004 | Brice, Jr. et al. | |
| 2005/0188372 A1* | 8/2005 | Inoue et al. | 718/100 |
| 2008/0294832 A1* | 11/2008 | Muppirala et al. | 710/316 |
| 2010/0153605 A1 | 6/2010 | Rogers et al. | |
| 2011/0173622 A1* | 7/2011 | Shin et al. | 718/102 |
| 2011/0179413 A1 | 7/2011 | Subramanian et al. | |

OTHER PUBLICATIONS

Office Action mailed Jan. 28, 2014 for U.S. Appl. No. 13/680,752; 8 pages.

(Continued)

*Primary Examiner* — Titus Wong
(74) *Attorney, Agent, or Firm* — Francis Lammes; Stephen J. Walder, Jr.; Matthew B. Talpis

(57) ABSTRACT

A mechanism is provided for offloading an input/output (I/O) completion operation. Responsive to a second processor identifying that a flag has been set by a first processor requesting assistance in completing an I/O operation, the second processor copies an I/O response from a first I/O response data structure associated with the first processor to a second I/O response data structure associated with the second processor. The second processor deletes the I/O response from the first I/O response data structure, clears the flag, and processes the I/O operation by addressing the I/O response in the second I/O response data structure. Responsive to completing the I/O operation, the second processor deletes the I/O response from the second I/O response data structure.

8 Claims, 4 Drawing Sheets

(56) References Cited

OTHER PUBLICATIONS

Response to Office Action filed Apr. 23, 2014, U.S. Appl. No. 13/680,752, 11 pages.
USPTO U.S. Appl. No. 13/680,752, 1 page.
Carter, D. W. et al., "Interface Between a Host Processor and an I/O Processor in a Multiprocessor System", IBM Corporation, www.ip.com, IPCOM000059986D, Feb. 1, 1986, 4 pages.
Lomet, D. B., "Efficient Task Switching With An Off-Load Processor", IBM Corporation, www.ip.com, IPCOM000068186D, Nov. 1, 1979, 3 pages.

* cited by examiner

OFFLOADING INPUT/OUTPUT (I/O) COMPLETION OPERATIONS

BACKGROUND

The present application relates generally to an improved data processing apparatus and method and more specifically to mechanisms for offloading input/output (I/O) completion operations.

Input/output (I/O) operations are computer operations sent from a processor or central processing unit (CPU) in a data processing system to an I/O or peripheral device, which may be either internal or external to the data processing system. External I/O devices may be devices such as a mouse, keyboard, printer, monitor, external Zip drive, or scanner and internal I/O devices may be devices such as CD-ROM drive, CD-R drive, internal modem, or the like. Input/output (I/O) operations may be extremely slow compared to the processing of data. Therefore, once a processor issues an I/O operation, the processor continues with other operations until the I/O device returns an I/O response to the I/O operation.

In order for each I/O operation to complete, the processor must address the I/O response from the I/O device. However, currently I/O response processing is delayed by the processor, while the processor to which the I/O response is associated with is busy with higher priority work. That is, I/O operations do not always have a highest priority when it comes to all computer operations. Thus, when an I/O response is received, the I/O response may be queued until such time that the processor is not processing an operation with a higher priority than the I/O response.

A typical strategy for I/O response processing is that once I/O device has completed a request, the I/O device requests attention from the processor that requested the I/O operation via a hardware interrupt. It is always desirable to acknowledge an interrupt as quickly as possible, because a processor cannot handle additional interrupts until the current interrupt is acknowledged by resetting an end of interrupt (EOI) line. For this reason, a processor typically performs only a minimal amount of work before the EOI. This work would be determining the nature of the interrupt, the type of interrupt, priority of work needed, and scheduling the work. The work that is scheduled in response to an interrupt is said to run at "interrupt priority." Interrupt priority is actually a generic term for a set of relative priorities all of which are favored over a processor's normal work, but may vary in relative priority. I/O response processing is typically given a medium to low interrupt priority. This means that I/O responses will be addressed before any non-interrupt priority processes, but will wait behind more favored interrupt priorities. This prioritization of interrupt handling, attempts to prevent lower priority work from languishing by limiting higher priority work to short predictable sequences. Thus, known solutions utilize careful assignments of interrupt priorities to ensure the I/O responses are addressed in a timely fashion.

However, a drawback to the known solutions is that a flurry of higher priority work, or other conditions that may slow hardware response times, may have the effect of preventing I/O responses from running for hundreds of milliseconds or more. These long delays may be interpreted by users as unacceptably sluggish response or by software applications as failures which can cause them to trigger various undesirable responses including shutting down an application.

SUMMARY

In one illustrative embodiment, a method, in a data processing system, is provided for offloading an input/output (I/O) completion operation. In the illustrative embodiment, a second processor copies an I/O response from a first I/O response data structure associated with a first processor to a second I/O response data structure associated with the second processor in response to the second processor identifying that a flag has been set by the first processor requesting assistance in completing an I/O operation. In the illustrative embodiment, the second processor deletes the I/O response from first I/O response data structure. In the illustrative embodiment, the second processor clears the flag. In the illustrative embodiment, the second processor processes the I/O operation by addressing the I/O response in the second I/O response data structure. In the illustrative embodiment, the second processor deletes the I/O response from the second I/O response data structure in response to completing the I/O operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In order to address situations where a processor is processing higher priority work or other conditions that may slow hardware response times, which may have an effect of preventing I/O responses from running for hundreds of milliseconds or more, the illustrative embodiments provide an I/O completion mechanism that prevents I/O response from being delayed for long periods of time while the processor to which the I/O response is associated is busy with the higher priority work. In a symmetric multiprocessor (SMP) system, there is a plurality of processors in addition to the processor that issued the I/O operation associated with the I/O response. Thus, one of the processors in the plurality of processors will most likely be available to complete the I/O operation by addressing the I/O response from the I/O device. That is, a processor other than the processor that originally issued the I/O operation may complete the I/O operation by addressing the I/O response.

Figure 1:
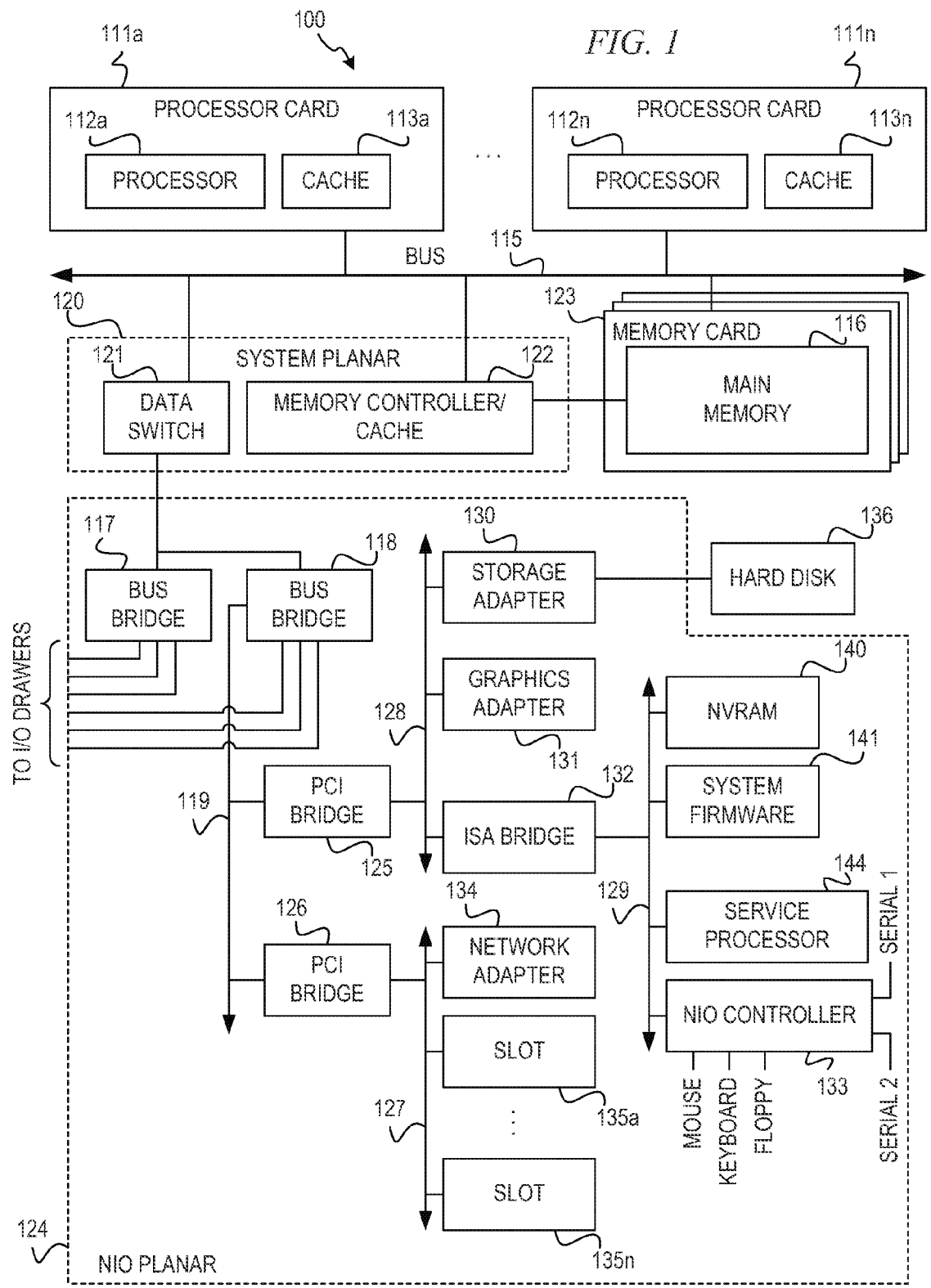
FIG. 1 depicts a block diagram of a data processing system with which aspects of the illustrative embodiments may advantageously be utilized.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

Referring now to the drawings and in particular to FIG. 1, there is depicted a block diagram of a data processing system with which aspects of the illustrative embodiments may advantageously be utilized. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that comprise main memory 116.

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via storage adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
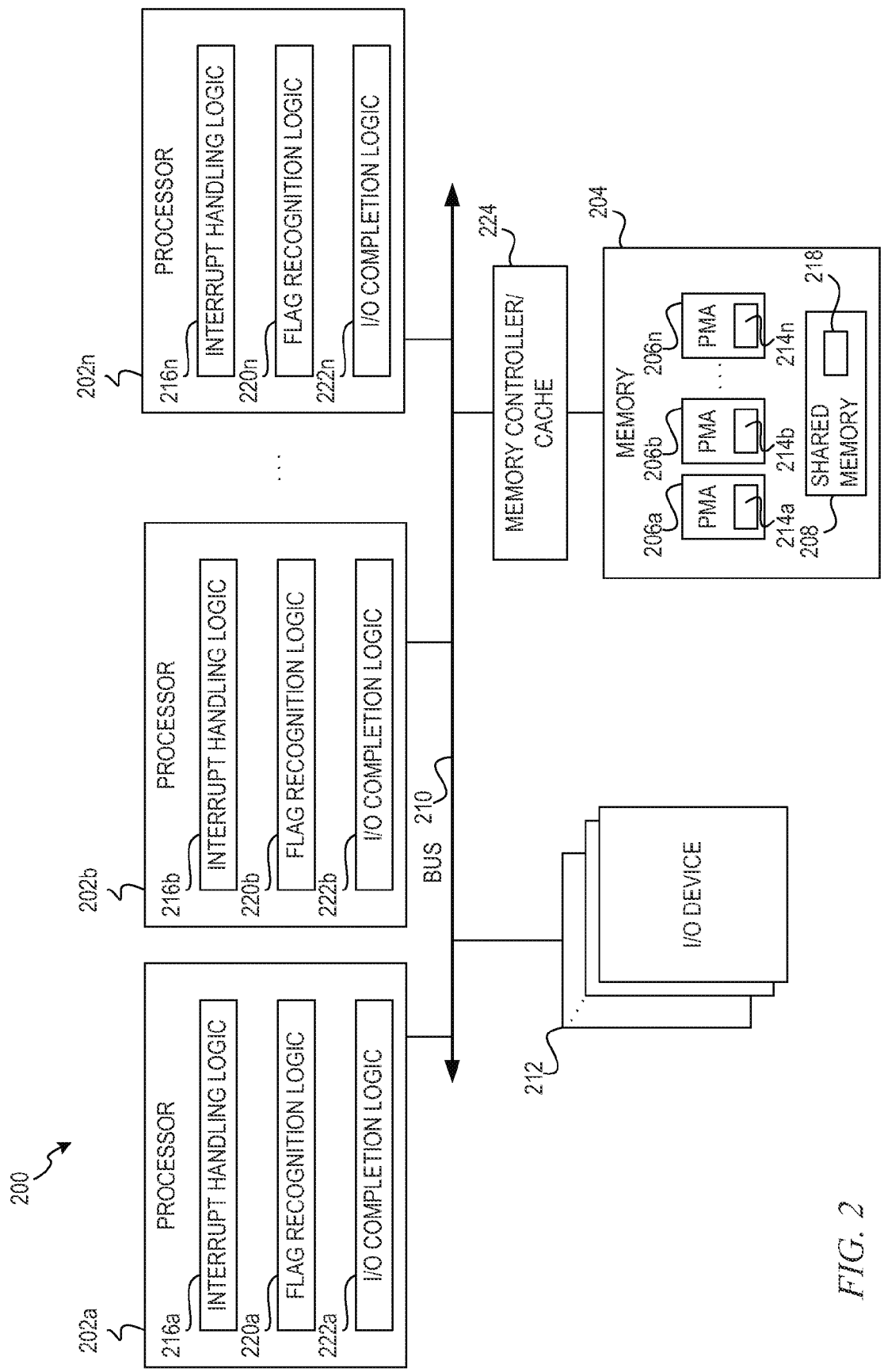
FIG. 2 depicts a functional block diagram of such an I/O operation completion mechanism in accordance with an illustrative embodiment.

Again, in a symmetric multiprocessor (SMP) system, it is likely that there will be other processors that are available to complete I/O operations that are currently queued to an originating processor that is occupied with higher priority work. Thus, the illustrative embodiment provides a mechanism by which another processor, separate from the originating processor, may detect I/O responses to I/O operations that are languishing due to the originating processor being busy on higher priority work. FIG. 2 depicts a functional block diagram of such an I/O operation completion mechanism in accordance with an illustrative embodiment. Data processing system 200 comprises a plurality of processors 202a-202n and main memory 204, which are coupled together via bus 210. For each of processors 202a-202n, main memory 204 comprises private memory areas 206a-206n and shared memory area 208. That is, private memory area 206a is a private memory area that is associated with processor 202a, private memory area 206b is a private memory area that is associated with processor 202b, . . . , and private memory area 206n is a private memory area that is associated with processor 202n. Shared memory area 208 is a memory area that is associated with all processors 202a-202n.

When, for example, processor 202a issues one or more I/O operations to one or more of I/O devices 212, one or more I/O devices 212 execute the one or more I/O operations and each I/O device 212 provides an I/O response back to processor 202a. However, processor 202a may be busy with higher priority work. Thus, memory controller 224 stores each I/O response to each I/O operation from processor 202a in I/O response data structure 214a within private memory area 206a associated with processor 202a. It is recognizable to one of ordinary skill in the art, that the same holds true for processors 202b-202n. In that, each I/O response to each I/O operation from processor 202b is stored in I/O response data structure 214b within private memory area 206b associated with processor 202b, and each I/O response to each I/O operation from processor 202n is stored in I/O response data structure 214n within private memory area 206n associated with processor 202n. In accordance with the illustrative embodiments, as each I/O response is stored in its respective one of I/O response data structures 214a-214n, a timestamp reflecting a time at which the I/O response is stored in its respective one of I/O response data structures 214a-214n is associated with the I/O response.

Once memory controller 224 stores the I/O response in its respective one of response data structure 214a-214n, memory controller 224 issues a hardware interrupt to the associated one of processors 202a-202n. Continuing with the example above, processor 202a has issued an I/O operation to one of I/O device 212 and, responsive to executing the I/O operation, I/O device 212 has replied with an I/O response, which is stored in I/O response data structure 214a and causes a hardware interrupt to be issued to processor 202a. Responsive to receiving the hardware interrupt or at periodic intervals, interrupt handling logic 216a within processor 202a determines whether the I/O response is migratable. That is, some I/O responses my be able to be migrated to another processor, while other I/O responses may not be migrated. Therefore, interrupt handling logic 216a determines whether the I/O response indicates migratability. If interrupt handling logic 216a determines that the I/O response may not be migrated, then interrupt handling logic 216a stops processing migration of the I/O response. However, if interrupt handling logic 216a determines that the I/O response may be migrated, interrupt handling logic 216a accesses the timestamp associated with each entry in I/O response data structure 214a. Interrupt handling logic 216a subtracts the time associated with the timestamp from a current time to determine a wait time. Interrupt handling logic 216a then compares the wait time to a wait-time threshold value. If interrupt handling logic 216a determines that the wait-time threshold value is exceeded, interrupt handling logic 216a sets a flag in flag data structure 218 in shared memory 208. The purpose of this flag is to request assistance of one of processors 202b-202n in completing the I/O operation associated with the I/O response that has a wait time greater than the wait-time threshold value. Thus, the flag indicates the I/O response in I/O response data structure 214a that has a wait time greater than the wait-time threshold value. Further, since the flag is in flag data structure 218, each of processors 202a-202n has visibility to see the flag. Once again, it is recognizable to one of ordinary skill in the art, that each of processors 202a-202n has its own associated interrupt handling logic 216a-216n.

Each of processors 202a-202n also has associated flag recognition logic 220a-220n. At periodic intervals, flag recognition logic 220a-220n determines whether a flag has been set in flag data structure 218. If one or more of flag recognition logic 220a-220n determines that a flag has been set in flag data structure 218, then each of the flag recognition logic 220b-220n that identify the flag attempts to lock, in this example, I/O response data structure 214a. This attempt to lock is a first-to-obtain-lock event. That is, the first of processors 202a-202n that completes the lock will be the processor that will process the I/O response that has a wait time greater than the wait-time threshold value. This locking by the first-to-obtain-lock processor is required because response data structure 214a is within private memory area 206a, which is normally only accessible by processor 202a. However, in accordance with the illustrative embodiments, I/O response data structure 214a-214n within private memory areas 206a-206n may be accessed by any of processors 202a-202n within data processing system 200. Thus, a locking mechanism is added to each of I/O response data structure 214a-214n so that, when an I/O response within I/O response data structure 214a-214n is being addressed, the one of processors 202a-202n that is addressing the I/O response has locked the data structure so that other processors do not address the particular I/O response.

Thus, once, for example, flag recognition logic 220b identifies a flag in flag data structure 218 and locks I/O response data structure 214a, processor 202b copies the I/O response from I/O response data structure 214a to I/O response data structure 214b, deletes the I/O response from I/O response data structure 214a, unlocks I/O response data structure 214a, and clears the flag associated with the I/O response from flag data structure 218. Processor 202b then completes the I/O operation by addressing the I/O response now in its I/O response data structure 214b by executing I/O completion logic 222b just as if processor 202b had been the one to issue the I/O operation. Upon completing the I/O operation by addressing the I/O response, processor 202b deletes the I/O response from I/O response data structure 214b. Once again, it is recognizable to one of ordinary skill in the art that each of processors 202a-202n has its own associated I/O completion logic 222a-222n.

It is also possible that, even after interrupt handling logic 216a sets the flag in flag data structure 218 in shared memory 208 after determining that the wait time of the I/O response is greater than the wait-time threshold value, processor 202a may finish its work with a higher priority. Thus, if no other one of processor 202b-202n has "helped," processor 202a may perform the same operation in order to address the I/O response that has been flagged. That is, processor 202a locks I/O response data structure 214a, addresses the I/O response, deletes the I/O response from I/O response data structure 214a, and clears the flag associated with the I/O response from flag data structure 218.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
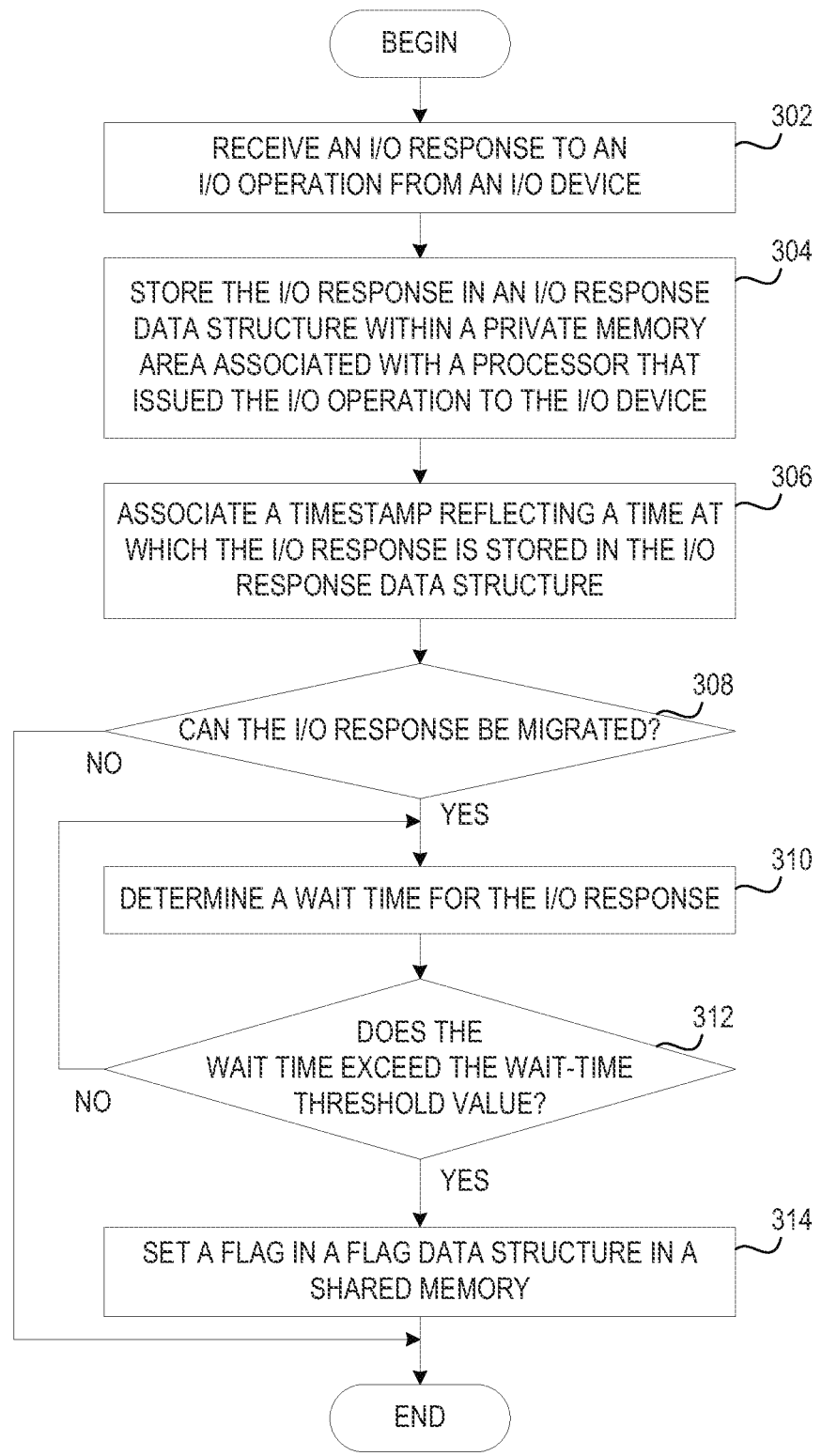
FIG. 3 depicts a flowchart of the operation performed in a multiprocessor data processing system for a processor to request assistance from another processor in completing an I/O operation in accordance with an illustrative embodiment.

FIG. 3 depicts a flowchart of the operation performed in a multiprocessor data processing system for a processor to request assistance from another processor in completing an I/O operation in accordance with an illustrative embodiment. As the operation begins, a memory controller receives an I/O response to an I/O operation from an I/O device (step 302). The memory controller stores the I/O response in an I/O response data structure within a private memory area associated with a processor that issued the I/O operation to the I/O device (step 304). The memory controller then associates a timestamp reflecting a time at which the I/O response is stored in the I/O response data structure (step 306). The memory controller then determines whether the I/O response is migratable (step 308) by looking for a migratability indicator associated with the I/O response. If at step 308 the memory controller determines that the I/O response may not be migrated, then the operation terminates.

If at step 308 the memory controller determines that the I/O response may be migrated, then, at a regular interval, the processor with which the I/O response is associated accesses the timestamp associated with each I/O response entry in its respective data structure in order to determine a wait time for each I/O response (step 310). The processor determines the wait time by subtracting the time associated with the timestamp of the I/O response from a current time. The processor then compares the wait time to a wait-time threshold value to determine whether the wait time exceeds the wait-time threshold value (step 312). If at step 312 the processor determines that the wait time does not exceed the wait-time threshold value, then the operation returns to step 310 where, at the next interval, the processor will determine a new wait time by subtracting the time associated with the timestamp of the I/O response from a current time. If at step 312 the processor determines that the wait time exceeds the wait-time threshold value, the processor sets a flag in a flag data structure in a shared memory (step 314), with the operation ending thereafter. The purpose of this flag is to request assistance of another processor in completing the I/O operation associated with the I/O response that has a wait time greater than the wait-time threshold value.

Figure 4:
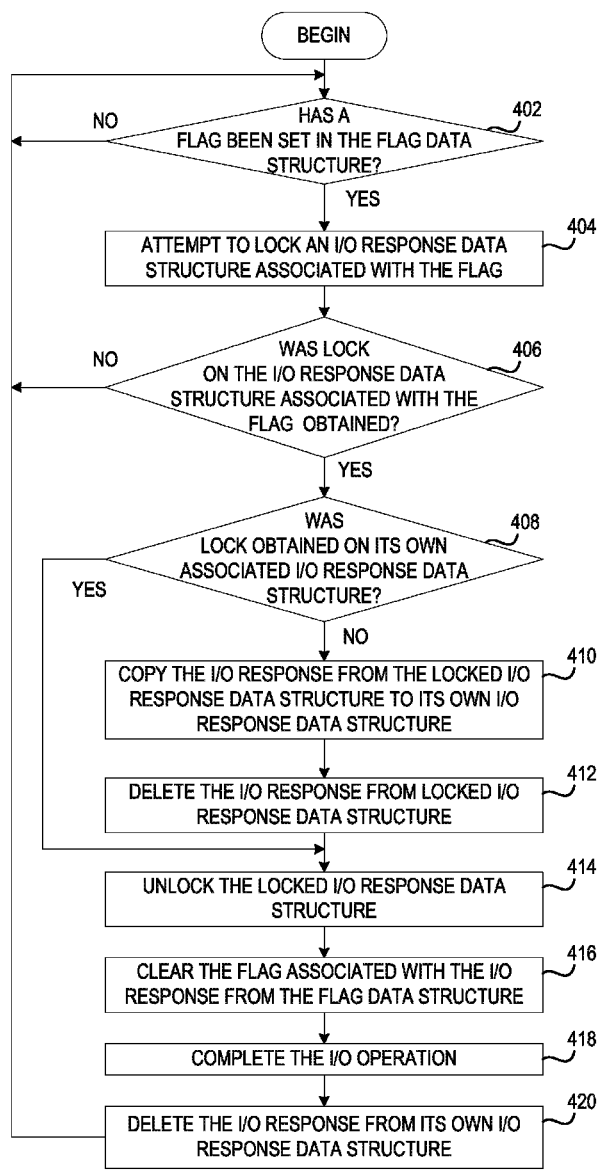
FIG. 4 depicts a flowchart of the operation performed in a multiprocessor data processing system for assisting another processor in completing an I/O operation in accordance with an illustrative embodiment.

FIG. 4 depicts a flowchart of the operation performed in a multiprocessor data processing system for assisting another processor in completing an I/O operation in accordance with an illustrative embodiment. As the operation begins, a processor determines at regular intervals whether a flag has been set in the flag data structure (step 402). If at step 402 the processor determines that a flag has not been set, then the operation returns to step 402. If at step 402 the processor determines that a flag has been set, then the processor attempts to lock an I/O response data structure associated with the flag (step 404). The processor then determines whether the lock on the I/O response data structure associated with the flag was obtained (step 406). If at step 406 the lock was not obtained, then the operation returns to step 402. The lock not being obtained normally indicates that another processor obtained the lock thus the flag should be deleted shortly thereafter. Thus, the operation returns to step 402 to determine whether a flag has been set in the flag data structure at the next interval.

If at step 406 the lock was obtained, the processor determines whether the I/O data structure to which the lock was obtained is its own associated I/O response data structure (step 408). If at step 408 the processor determines that the I/O response data structure is not its own associated I/O response data structure, then the processor copies the I/O response from the locked I/O response data structure to its own I/O response data structure (step 410). The processor then deletes the I/O response from locked I/O response data structure (step 412) and unlocks the locked I/O response data structure (step 414). The processor then clears the flag associated with the I/O response from the flag data structure (step 416). The processor then completes the I/O operation by addressing the I/O response now in its own I/O response data structure by executing I/O completion logic just as if the processor had been the one to issue the I/O operation (step 418). Upon completing the I/O operation by addressing the I/O response, the processor deletes the I/O response from its own I/O response data structure (step 420), with the operation returning to step 402 thereafter. If at step 408 the processor determines that the I/O response data structure is its own associated I/O response data structure, then the operation proceeds to step 414.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, in order to address situations where a processor is processing higher priority work or other conditions that may slow hardware response times, which may have an effect of preventing I/O responses from running for hundreds of milliseconds or more, the illustrative embodiment provides a mechanism by which another processor, separate from the originating processor, may detect I/O responses to I/O operations that are languishing due to the originating processor being busy on higher priority work.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a multi-processor data processing system, for offloading an input/output (I/O) completion operation, the method comprising:
   responsive to a second processor identifying that a flag has been set by a first processor requesting assistance in completing an I/O operation, copying, by the second processor, an I/O response from a first I/O response data structure associated with the first processor to a second I/O response data structure associated with the second processor;
   deleting, by the second processor, the I/O response from the first I/O response data structure;
   clearing, by the second processor, the flag;
   processing, by the second processor, the I/O operation by addressing the I/O response in the second I/O response data structure; and
   responsive to completing the I/O operation, deleting, by the second processor, the I/O response from the second I/O response data structure.

2. The method of claim 1, wherein the flag is in a flag data structure in a shared memory area.

3. The method of claim 1, wherein the first I/O response data structure is in a private memory area owned by the first processor.

4. The method of claim 1, wherein the second I/O response data structure is in a private memory area owned by the second processor.

5. The method of claim 1, wherein the second processor gains access to the first I/O response data structure by the method comprising:
   locking, by the second processor, the first I/O response data structure prior to copying the I/O response from the first I/O response data structure associated with the first processor to the second I/O response data structure associated with the second processor; and
   responsive to the second processor deleting the I/O response from the first I/O response data structure, unlocking, by the second processor, the first I/O response data structure.

6. The method of claim 5, further comprising:

prior to the second processor locking the first I/O response data structure, determining, by the second processor, whether another processor has already obtained a lock on the first I/O response data structure;

responsive to a determination, by the second processor, that no other processor has obtained the lock on the first I/O response data structure, proceeding, by the second processor, with obtaining the lock on the first I/O response data structure; and responsive to a determination, by the second processor, that the other processor has obtained the lock on the first I/O response data structure, discontinuing, by the second processor, the process of assisting in completion of the I/O operation.

7. The method of claim 1, further comprising:

responsive to the first processor completing higher priority work and identifying that the flag was set by a first processor requesting assistance in completing the I/O operation, clearing, by the first processor, the flag;

processing, by the first processor, the I/O operation by addressing the I/O response in the second I/O response data structure; and responsive to completing the I/O operation, deleting, by the first processor, the I/O response from the first I/O response data structure.

8. The method of claim 1, wherein the flag indicating the requested assistance in completing the I/O operation is set by the method comprising:

responsive to the I/O response being migratable, accessing, by the first processor, a timestamp associated with the I/O response entry in the first I/O response data structure;

subtracting, by the first processor, the time value associated with the timestamp from a current time, thereby forming a wait time;

determining, by the first processor, whether the wait time exceeds a wait-time threshold value; and responsive to the wait time exceeding the wait-time threshold value, setting, by the first processor, the flag in a flag data structure in a shared memory area.

\* \* \* \* \*